(12) United States Patent
Scholz

(10) Patent No.: US 10,720,749 B2
(45) Date of Patent: Jul. 21, 2020

(54) GENERATION OF FREQUENCY-TRIPLED LASER RADIATION

(71) Applicant: TOPTICA Photonics AG, Grafing (DE)

(72) Inventor: Matthias Scholz, Munich (DE)

(73) Assignee: TOPTICA Photonics AG, Grafelfing (DE)

( * ) Notice: Subject to any disclaimer, the term of this patent is extended or adjusted under 35 U.S.C. 154(b) by 0 days.

(21) Appl. No.: 16/391,839

(22) Filed: Apr. 23, 2019

(65) Prior Publication Data

US 2019/0326721 A1    Oct. 24, 2019

(30) Foreign Application Priority Data

Apr. 24, 2018    (DE) .................... 10 2018 109 763

(51) Int. Cl.
*H01S 3/10*    (2006.01)
*H01S 3/109*    (2006.01)
*H01S 3/081*    (2006.01)
*H01S 3/08*    (2006.01)

(52) U.S. Cl.
CPC ............ *H01S 3/109* (2013.01); *H01S 3/0813* (2013.01); *H01S 3/08054* (2013.01)

(58) Field of Classification Search
CPC ..... H01S 3/109; H01S 3/08054; H01S 3/0813
See application file for complete search history.

(56) References Cited

U.S. PATENT DOCUMENTS

| 5,034,951 A * | 7/1991 | Edelstein | H01S 3/109 359/326 |
| 5,408,481 A * | 4/1995 | Scheps | H01S 3/0811 359/326 |
| 9,036,249 B2 * | 5/2015 | Gapontsev | G02F 1/353 359/329 |
| 2006/0250677 A1* | 11/2006 | Hoffman | G02F 1/35 359/326 |

(Continued)

*Primary Examiner* — Kinam Park
(74) *Attorney, Agent, or Firm* — Raymond R. Ferrera; Adams and Reese LLP

(57) ABSTRACT

The invention relates to a method of generating frequency-tripled laser radiation (THG). It is the object of the invention to demonstrate an efficient approach to generating frequency-tripled laser radiation. The method according to the invention comprises the following method steps:
  providing a first laser radiation at a fundamental frequency,
  coupling the first laser radiation into an optical resonator, which is resonant at the fundamental frequency,
  generating a second laser radiation by second-harmonic generation of the first laser radiation in a type-I process in a first nonlinear optical crystal (3), which is located in the optical resonator, wherein the second laser radiation has a polarization direction,
  rotating the polarization direction of the second laser radiation, preferably by an angle of substantially 90°, and
  generating a third laser radiation by generating the sum frequency of the first and second laser radiations in a type-I process in a second nonlinear optical crystal (9), which is likewise located in the optical resonator.

The invention also relates to a device for generating frequency-tripled laser radiation.

19 Claims, 1 Drawing Sheet

(56) References Cited

U.S. PATENT DOCUMENTS

| | | | | |
|---|---|---|---|---|
| 2009/0059974 A1* | 3/2009 | Wang | .................. | H01S 3/109 |
| | | | | 372/22 |
| 2014/0016186 A1* | 1/2014 | Fujikawa | .................. | G02F 1/37 |
| | | | | 359/328 |
| 2018/0342848 A1* | 11/2018 | Roth | .................. | H01S 3/109 |

* cited by examiner

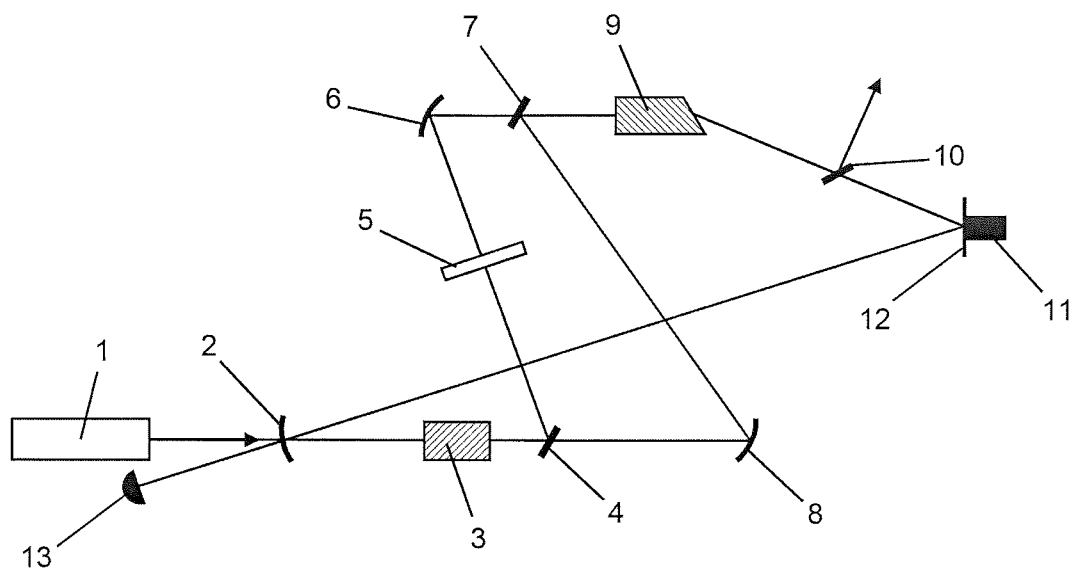

GENERATION OF FREQUENCY-TRIPLED LASER RADIATION

The invention relates to a method and a device for generating frequency-tripled laser radiation.

The invention relates to the field of nonlinear optics. The generation of laser radiation with higher harmonics of a fundamental frequency is known in various configurations from the prior art. For example, it is known to generate laser radiation at the fundamental frequency using a laser and to couple it into an optical resonator, in which the laser radiation circulates and is resonantly enhanced in terms of its amplitude, wherein a nonlinear optical crystal is located in the resonator, said nonlinear optical crystal converting the laser radiation (in part) to laser radiation at a second or higher harmonic frequency owing to its nonlinear susceptibility. As a result of the resonant enhancement, sufficient efficiency of the frequency conversion is achieved which depends on the amplitude of the laser radiation involved in the nonlinear process.

The nonlinear optical processes exploited in the frequency conversion are phase-sensitive. This applies to processes such as second-harmonic generation, sum and difference frequency generation, parametric amplification and four-wave mixing. This means in particular that, for optimal nonlinear frequency conversion, a suitable phase relationship must be maintained between the interacting laser beams along the direction of propagation. Only when this condition, which is also known as phase matching, is met are the amplitude contributions of the individual waves emitted from various locations in the nonlinear crystal all in phase with the laser radiation of the higher harmonics at the end of the nonlinear crystal. In this case, the individual waves interfere constructively and a maximum overall amplitude of the laser radiation with the higher harmonics is obtained.

The conventional technique for achieving phase matching in nonlinear crystals is birefringent phase matching, wherein the birefringence in the nonlinear crystal is utilized to cancel out the phase mismatching. This technique is applied in different variants:

In so-called type-I processes, laser beams with the same polarization direction interact. In type-II processes, two laser beams with perpendicular polarization directions interact. The difference between type-I and type-II processes similarly applies to second-harmonic generation and other types of nonlinear frequency conversion. The different variants of phase matching have different practical effects, in particular for the combination of multiple nonlinear processes.

Methods of generating frequency-tripled laser radiation ("third harmonic generation"—THG) that are known from the prior art use two consecutive nonlinear processes, namely a frequency doubling ("second harmonic generation"—SHG) and a subsequent sum frequency generation ("sum frequency mixing"—SFM), since higher-order nonlinear processes, which would enable direct frequency tripling, are associated with much lower efficiency. For example, it is known to generate frequency-tripled laser radiation at 355 nm, starting from laser radiation at a wavelength of 1064 nm, by series-connecting a type-I and a type-II process in an LBO (lithium triborate) crystal in each case. In this case, only part of the laser radiation at 1064 nm is converted to a second laser radiation at 532 nm in the first crystal (SHG process). This radiation at 532 nm and the unconverted part of the radiation at 1064 nm are then used to generate laser radiation at 355 nm in a second crystal (SFM process).

For frequency tripling for the purpose of generating laser radiation in the (deep) ultraviolet spectral region (e.g. at 213 nm), however, a cascading of LBO and BBO (β-barium borate) is necessary. In this case both the SHG process in LBO and the SFM process in BBO are type-I processes. In the SHG process in particular a frequency-doubled laser radiation is generated, the polarization direction of which is rotated by 90° relative to that of the laser radiation at the fundamental frequency. However, the SFM process requires two laser beams with the same polarization direction. The cascading of these processes thus requires a polarization rotation by 90° of the laser radiation at the fundamental frequency or of the frequency-doubled laser radiation. It is known from the prior art to use a separate optical resonator for each of the two frequency conversion steps (see Mes et al., Applied Physics Letters, vol. 82, no. 25, p. 4423, 2003). It is disadvantageous that this method is very inefficient, since on the one hand losses occur in both optical resonators as a result of mode and impedance matching and on the other hand passive losses occur in two separate mirror arrangements.

Furthermore, single-pass arrangements are known from the prior art, as well as frequency conversion within laser resonators in which dual-wavelength waveplates are used to achieve the necessary polarization rotation between the laser radiation at the fundamental frequency and that at the doubled frequency (see Rodriguez-Garcia et al., IEEE J. Sel. Top. Quantum Electron., vol. 23, no. 6, 5100608, 2017). Disadvantageous here are the losses occurring in the waveplates, which are in the range of 1-2%. Despite the losses that occur, however, this method is still efficient because of the low finesse of the laser resonators. For frequency conversion in an external optical resonator with correspondingly high requirements regarding freedom from losses, however, the known approach is not efficient. Moreover, in the prior art the problem occurs that the laser radiation at the fundamental frequency and the frequency-doubled laser radiation leave the SHG crystal with a walk-off which has to be compensated again before the SFM crystal. Only if—as in some laser resonators—beam diameters are used which are large compared to the walk-off is this effect negligible. In external optical resonators (arranged outside a laser) with nonlinear optical crystals located therein, however, the beam diameters are typically too small to achieve a high nonlinear conversion efficiency.

Against this background, the object of the invention is to demonstrate an efficient approach to generating frequency-tripled laser radiation.

The invention achieves this object by a method of generating frequency-tripled laser radiation in which, firstly, a first laser radiation at a fundamental frequency is provided and coupled into an optical resonator, which is resonant at the fundamental frequency. A second laser radiation is then generated at a frequency of double the fundamental frequency by a type-I process in a first nonlinear optical crystal (SHG crystal), which is located in the optical resonator.

Only part of the first laser radiation, in particular no more than 30% of the circulating power, is converted. The second laser radiation has in particular a polarization direction. This polarization direction is rotated, preferably by an angle of substantially 90°, particularly preferably by an angle between 70° and 110°, before a third laser radiation is generated from the first and second laser radiations by sum frequency generation. This sum frequency generation is a type-I process in a second nonlinear optical crystal (SFM crystal), which is likewise located in the optical resonator.

An essential advantage of the solution according to the invention over the prior art is that both the SHG crystal and the SFM crystal are arranged in the same optical resonator which resonantly enhances the first laser radiation (at the fundamental frequency). The losses in solutions known from the prior art, which employ separate resonators for the two cascaded nonlinear processes, are dramatically reduced by the use of only a single optical resonator. The invention allows the necessary power at the fundamental frequency to be reduced significantly, in particular by more than 20%.

In a preferred embodiment of the method according to the invention, the second (frequency-doubled) laser radiation is coupled out of the resonator behind the first and in front of the second nonlinear optical crystal in the beam direction, the polarization direction being rotated outside the resonator, after which the second laser radiation is coupled back into the resonator. In this embodiment, the relatively lossy polarization adjusting element, preferably a waveplate, particularly preferably a half-wave plate, for rotating the polarization direction of the second laser radiation is outside the resonator. The second laser radiation is split off from the first laser radiation after the SHG crystal, passes through the polarization adjusting element and is then coupled back into the resonator, so that the second laser radiation with the correct polarization for the second type-I process (SMF) is substantially overlaid with the first laser radiation in the second nonlinear optical crystal. Preferably, in the second nonlinear optical crystal, the beam positions of the first and second laser radiations deviate from each other by less than five times the beam radius of the first laser radiation. Particularly preferably, the beam directions also deviate from each other only slightly, so that this condition applies along the entire length of the nonlinear optical crystal.

The second laser radiation can be coupled out of the resonator e.g. by reflection at a first dichroic mirror behind the first nonlinear optical crystal. The first dichroic mirror is in particular configured such that it reflects the second laser radiation and is transparent to the first laser radiation. To minimize the losses in the resonator, the first laser radiation should have a polarization direction and the angle of incidence of the first laser radiation on the first dichroic mirror should deviate by less than 20°, preferably by less than 10°, from the Brewster angle for the first laser radiation. Close to the Brewster angle a transparency of the first dichroic mirror of more than 99.8% can be achieved for the first laser radiation.

The second laser radiation can be coupled back into the resonator in particular by means of a second dichroic mirror after the polarization direction has been rotated.

The coupling of the third (frequency-tripled) laser radiation out of the resonator as usable radiation behind the second nonlinear optical crystal can preferably take place by means of a third dichroic mirror. The third dichroic mirror is preferably transparent to the first laser radiation and reflects the third laser radiation. To minimize the losses in the resonator again, the first laser radiation should have a polarization direction and the angle of incidence of the first laser radiation on the third dichroic mirror should deviate by less than 10°, preferably by less than 5°, from the Brewster angle for the first laser radiation.

The method according to the invention is advantageously suitable for generating frequency-tripled laser radiation in the ultraviolet spectral region at a wavelength of below 400 nm, preferably in the deep ultraviolet spectral region, i.e. at a wavelength of below 300 nm. Thus, starting from a first laser radiation with a wavelength in the red spectral region between 600 and 800 nm, e.g. at 639 nm, a second laser radiation at 320 nm can firstly be generated by second-harmonic generation. This second laser radiation is then converted to a third laser radiation at 213 nm in the next step by sum frequency generation (from the first laser radiation at 639 nm and the second laser radiation at 320 nm).

By the method according to the invention, starting from a first laser radiation with an average power of less than 100 W, frequency-tripled laser radiation (in the deep UV) can be generated with an average power of at least 100 mW. The underlying object is also achieved by the invention by means of a device for generating frequency-tripled laser radiation, having an optical resonator, which is resonant at the fundamental frequency, a first nonlinear optical crystal, which is located in the optical resonator and converts part of a first laser radiation, which is generated by means of a suitable laser, in particular no more than 30% of the circulating power, to a second frequency-doubled laser radiation by second-harmonic generation in a type-I process, a polarization adjusting element, which rotates the polarization direction of the second laser radiation, preferably by an angle of substantially 90°, particularly preferably by an angle of between 70° and 110°, and which is preferably arranged outside the optical resonator, and a second nonlinear optical crystal, which is likewise located in the resonator, behind the first nonlinear optical crystal in the beam path and which converts at least part of the first and second laser radiations to a third, frequency-tripled laser radiation by sum frequency generation in a further type-I process.

The first nonlinear optical crystal is expediently an LBO crystal, while the second nonlinear optical crystal is preferably a BBO crystal. For rotating the polarization of the second laser radiation a first dichroic mirror is preferably arranged behind the first nonlinear optical crystal in the beam path, said first dichroic mirror coupling the second laser radiation out of the resonator. Between the first dichroic mirror and the second nonlinear optical crystal in the beam path in this case, a second dichroic mirror is arranged, which couples the second laser radiation back into the resonator. To minimize the losses in the resonator, as explained above, the polarization adjusting element, preferably in the form of a waveplate, particularly preferably a half-wave plate, is located between the first and second dichroic mirrors in the beam path of the outcoupled second laser radiation, i.e. outside the optical resonator.

An exemplary embodiment of the invention is explained in more detail below with reference to the drawing. This shows the following:

FIG. 1: device according to the invention as a block diagram.

The device shown schematically in FIG. 1 comprises a laser system 1, which generates laser radiation at a fundamental frequency. The fundamental laser radiation can be generated in the laser system 1 e.g. by means of a diode laser which emits at 1278 nm. The infrared radiation of the diode laser is amplified and frequency-doubled and leaves the laser system 1 as first laser radiation with a fundamental wavelength of 639 nm, e.g. with an average power of approx. 30 W and linear polarization. The first laser radiation is coupled into an optical resonator via an input mirror 2, which resonantly enhances the first laser radiation. The first laser radiation circulates in the resonator with tangential polarization. In the optical resonator there is a first nonlinear optical crystal, specifically an LBO crystal 3. This converts part of the circulating first laser radiation to a second, frequency-doubled laser radiation at 320 nm in a type-I process (SHG). The second laser radiation is generated at the exit of the LBO crystal 3 with sagittal polarization and offset to the beam position of the first laser radiation and is coupled out of the resonator by means of a first dichroic mirror 4. This outcoupling takes place with particularly low losses and therefore very efficiently for the overall process, with the first laser radiation exiting the LBO crystal and impinging on the surface of the first dichroic mirror 4 at an angle that is as close as possible to the Brewster angle. The deviation from the Brewster angle should preferably be less than 20°, particularly preferably less than 10°, for the first laser radiation. The outcoupled second laser radiation at 320 nm, the average power of which is approx. 12 W, then passes through a waveplate 5 located outside the optical resonator, whereby the polarization direction is rotated by 90° for the subsequent sum frequency generation. The second laser radiation is then coupled back into the resonator via a mirror 6 and a second dichroic mirror 7. The first laser radiation, after passing through the LBO crystal 3 and the first dichroic mirror 4, is reflected at a mirror 8 and, by reflection at the second dichroic mirror 7, overlaid with the laser radiation that has been rotated in terms of the polarization direction in a second nonlinear optical crystal, a BBO crystal 9, which is in turn located in the resonator. Since the waveplate 5 is located outside the resonator and only the second laser radiation passes through it, the losses caused by the waveplate 5 do not affect the first laser radiation circulating in the resonator. The BBO crystal 9 generates a third, frequency-tripled laser radiation at 213 nm with an average power of approx. 500 mW from at least part of the first and second laser radiations by sum frequency generation in a further type-I process. The third laser radiation is coupled out of the resonator by means of a third dichroic mirror 10 and is then available as usable radiation. Because of the different refractive indices of the crystal for the first, second and third laser radiations, the first, second and third laser radiations leave the BBO crystal 9 with an angular offset. For the sake of clarity, this is not illustrated in FIG. 1. To maximize efficiency, the angle of incidence of the first laser radiation on the surface of the third dichroic mirror 10 should be as close as possible to the Brewster angle. The deviation should be less than 10° and if possible less than 5°. A piezo adjusting element 11 supports a mirror 12, which guides the first laser radiation back on to the input mirror 2. A photodiode 13 measures the intensity of the resonantly enhanced fundamental laser radiation. The measurement signal of the photodiode 13 is used, e.g. by the known Pound-Drever-Hall method, to stabilize the resonator at the first frequency by means of the piezo adjusting element 11. A corresponding control device is not illustrated in FIG. 1 for the sake of clarity.

The invention claimed is:

1. A method of generating frequency-tripled laser radiation, having the following method steps:
   providing a first laser radiation at a fundamental frequency,
   coupling the first laser radiation into an optical resonator, which is resonant at the fundamental frequency,
   generating a second laser radiation by second-harmonic generation of the first laser radiation in a type-I process in a first nonlinear optical crystal, which is located in the optical resonator, wherein the second laser radiation has a polarization direction,
   rotating the polarization direction of the second laser radiation, preferably by an angle of substantially 90°, and
   generating a third laser radiation by generating the sum frequency of the first and second laser radiations in a type-I process in a second nonlinear optical crystal, which is likewise located in the optical resonator.

2. The method according to claim 1, wherein the second laser radiation is coupled out of the resonator behind the first and in front of the second nonlinear optical crystal in the beam direction, wherein the rotation of the polarization direction takes place outside the resonator, after which the second laser radiation is coupled back into the resonator.

3. The method according to claim 2, wherein the second laser radiation is coupled out of the resonator by reflection at a first dichroic mirror.

4. The method according to claim 3, wherein the first laser radiation has a polarization direction and the angle of incidence of the first laser radiation on the first dichroic mirror deviates by less than 20°, from the Brewster angle for the first laser radiation.

5. The method according to claim 2, wherein the second laser radiation is coupled back into the resonator by means of a second dichroic mirror, so that the first laser radiation and the second laser radiation are overlaid in the second nonlinear optical crystal.

6. The method according to claim 1, wherein the third laser radiation is coupled out of the resonator by means of a third dichroic mirror.

7. The method according to claim 4, wherein the first laser radiation has a polarization direction and the angle of incidence of the first laser radiation on the third dichroic mirror deviates by less than 10°, from the Brewster angle for the first laser radiation.

8. The method according to claim 1, wherein the wavelength of the third laser radiation is in the ultraviolet spectral region, preferably in the deep ultraviolet spectral region.

9. A device for generating frequency-tripled laser radiation, having
   an optical resonator, which is resonant at the fundamental frequency,
   a first nonlinear optical crystal-O, which is located in the optical resonator and converts part of a first laser radiation to a second laser radiation by second-harmonic generation in a type-I process, wherein the second laser radiation has a polarization direction,
   a polarization adjusting element, which rotates the polarization direction of the second laser radiation, preferably by an angle of substantially 90°, and
   a second nonlinear optical crystal, which is likewise located in the resonator, behind the first nonlinear optical crystal in the beam path, and which converts at least part of the first and second laser radiations to a third laser radiation by sum frequency generation in a further type-I process.

10. The device according to claim 9, wherein the first nonlinear optical crystal is an LBO crystal and the second nonlinear optical crystal is a BBO crystal.

11. The device according to claim 9, further comprising a first dichroic mirror arranged behind the first nonlinear optical crystal in the beam path, said first dichroic mirror coupling the second laser radiation out of the resonator, and a second dichroic mirror arranged between the first dichroic mirror and the second nonlinear optical crystal in the beam path, said second dichroic mirror coupling the second laser radiation back into the resonator.

12. The device according to claim 11, wherein the polarization adjusting element is located between the first and the second dichroic mirror in the beam path of the outcoupled second laser radiation.

13. The device according to claim 9, wherein the first laser radiation has a wavelength in the red spectral region.

14. The device according to claim 9, wherein the first laser radiation has an average power of less than 100 W.

15. The device according to claim 9, wherein the wavelength of the third laser radiation is in the ultraviolet spectral region.

16. The device according to claim 9, wherein the average power of the third laser radiation is al least 100 mW.

17. The method according to claim 3, wherein the first laser radiation has a polarization direction and the angle of incidence of the first laser radiation on the first dichroic mirror deviates by less than 10°, from the Brewster angle for the first laser radiation.

18. The method according to claim 7, wherein the first laser radiation has a polarization direction and the angle of incidence of the first laser radiation on the third dichroic mirror deviates by less than 5°, from the Brewster angle for the first laser radiation.

19. The device according to claim 9, wherein the wavelength of the third laser radiation is in the deep ultraviolet spectral region.

* * * * *

UNITED STATES PATENT AND TRADEMARK OFFICE
CERTIFICATE OF CORRECTION

| | |
|---|---|
| PATENT NO. | : 10,720,749 B2 |
| APPLICATION NO. | : 16/391839 |
| DATED | : July 21, 2020 |
| INVENTOR(S) | : Matthias Scholz |

Page 1 of 1

It is certified that error appears in the above-identified patent and that said Letters Patent is hereby corrected as shown below:

On the Title Page

Under Applicant: "TOPTICA Photonics AG, Grafing (DE)" should read -- TOPTICA Photonics AG, Grafelfing (DE) --.

Signed and Sealed this
Seventh Day of October, 2025

John A. Squires
*Director of the United States Patent and Trademark Office*